(12) United States Patent
Ahn et al.

(10) Patent No.: US 7,072,644 B2
(45) Date of Patent: Jul. 4, 2006

(54) METHOD FOR PROVIDING A CALLER-BASED RINGBACK TONE SOUND IN CASE OF A NON-SUBSCRIBED CALLED

(75) Inventors: Tae Ho Ahn, Seoul (KR); Yeong Tae No, Seoul (KR); Ok Ryul Yang, Seoul (KR); Jin Yong Choi, Goyang-si (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/531,383

(22) PCT Filed: Sep. 9, 2003

(86) PCT No.: PCT/KR03/01858

§ 371 (c)(1),
(2), (4) Date: Apr. 15, 2005

(87) PCT Pub. No.: WO2004/036944

PCT Pub. Date: Apr. 29, 2004

(65) Prior Publication Data
US 2006/0013377 A1    Jan. 19, 2006

(30) Foreign Application Priority Data
Oct. 18, 2002  (KR) .................... 10-2002-0063733

(51) Int. Cl.
*H04M 3/42* (2006.01)

(52) U.S. Cl. .................... 455/414.1; 370/259; 379/257

(58) Field of Classification Search ............. 455/414.1, 455/415, 445; 370/259; 379/88.23, 88.24, 379/157, 201.01, 204.01, 257, 361
See application file for complete search history.

(56) References Cited

U.S. PATENT DOCUMENTS

| | | | |
|---|---|---|---|
| 4,811,382 A | * | 3/1989 | Sleevi ........................ 379/67.1 |
| 5,321,740 A | * | 6/1994 | Gregorek et al. ......... 379/88.22 |

(Continued)

FOREIGN PATENT DOCUMENTS

JP    2000-050347    2/2000

(Continued)

OTHER PUBLICATIONS

International Search Report for PCT/KR2003/001858 issued Jan. 20, 2004.

*Primary Examiner*—William Trost
*Assistant Examiner*—James D Ewart
(74) *Attorney, Agent, or Firm*—Mayer, Brown, Rowe & Maw LLP (57) ABSTRACT

The present invention relates to a method for providing an arbitrary sound chosen by a subscriber instead of a conventional RBT, more particularly, to a method for providing a caller with an arbitrary sound chosen by the caller instead of an RBT in case that a called is not a subscriber of a called-based RBT replacement service. The present method comprises: a first step, conducted by an exchanger when a call is received from a terminal, of requesting a first trunk connection to other telephone communication network while requesting a second trunk connection to a sound providing means if it is confirmed that the calling terminal has subscribed to RBT replacement service and the called terminal is a subscriber of said other telephone communication network; and a second step, conducted by the sound providing means, of providing the calling terminal with an RBT-replacing sound set for the calling terminal through the exchanger.

8 Claims, 9 Drawing Sheets

U.S. PATENT DOCUMENTS

| | | | | |
|---|---|---|---|---|
| 5,926,537 A * | 7/1999 | Birze | ................ | 379/252 |
| 6,088,440 A * | 7/2000 | Millar et al. | ................ | 379/251 |
| 6,385,308 B1 * | 5/2002 | Cohen et al. | ................ | 379/88.23 |
| 6,574,335 B1 * | 6/2003 | Kalmanek et al. | ................ | 379/386 |
| 6,603,844 B1 * | 8/2003 | Chavez et al. | ................ | 379/114.13 |
| 6,687,341 B1 * | 2/2004 | Koch et al. | ................ | 379/88.17 |
| 6,937,708 B1 * | 8/2005 | Hirose | ................ | 379/93.12 |
| 6,985,570 B1 * | 1/2006 | Hasemann | ................ | 379/201.01 |
| 2002/0183048 A1 * | 12/2002 | Takeuchi | ................ | 455/414 |
| 2004/0114732 A1 * | 6/2004 | Choe et al. | ................ | 379/88.17 |
| 2004/0120493 A1 * | 6/2004 | Creamer et al. | ................ | 379/207.08 |
| 2004/0120494 A1 * | 6/2004 | Jiang et al. | ................ | 379/210.01 |
| 2004/0174983 A1 * | 9/2004 | Olschwang et al. | ................ | 379/377 |

FOREIGN PATENT DOCUMENTS

| | | | |
|---|---|---|---|
| JP | 2001-106685 | | 4/2001 |
| KR | 1020000000244 | | 1/2000 |
| KR | 1020000030035 | | 6/2000 |
| KR | 1020000055316 | | 9/2000 |
| KR | 2001-0108937 | | 12/2001 |
| KR | 1020020039501 | | 5/2002 |
| WO | 00/42763 | | 7/2000 |
| WO | WO0039988 | * | 7/2000 |
| WO | WO49793 | * | 8/2000 |
| WO | WO0186931 A1 | * | 11/2001 |

* cited by examiner

| Subscriber's Number | Sound Code |
|---|---|
| ⋮ | ⋮ |
| 293-XXXX | 07 |
| ⋮ | ⋮ |
| 294-0000 | 17 |
| ⋮ | ⋮ | changed → 07

FIG. 10

| Sound Code | Sound |
|---|---|
| 01 | Sound#1 |
| ⋮ | ⋮ |
| 07 | Sound#7 |
| ⋮ | ⋮ |
| 17 | Sound#17 |
| ⋮ | ⋮ |

ND CALLED

METHOD FOR PROVIDING A CALLER-BASED RINGBACK TONE SOUND IN CASE OF A NON-SUBSCRIBED CALLED

CROSS REFERENCE TO RELATED APPLICATION

This application is the National Phase application of International Application No. PCT/KR2003/001858, filed Sep. 9, 2003, which designates the United States and was published in English. This application, in its entirety, is incorporated herein by reference.

1. TECHNICAL FIELD

The present invention relates to a method for providing an arbitrary sound chosen by a subscriber for a calling subscriber instead of a conventional RBT (RingBack Tone).

The present invention relates, more particularly, to a method for providing an arbitrary sound chosen by a caller instead of an RBT in case that a called is not a subscriber of a called-based RBT replacement service.

2. BACKGROUND ART

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their personality.

By the way, various ad methods are being proposed in these days. One of these ad methods is to send an ad sound message to a caller instead of a conventional RBT. However, such an ad sound message is chosen unilaterally by a network operating enterprise. If a caller heard such a unilateral ad sound he or she could talk over a mobile telephone with a called for a limited time.

However, the method that an ad sound is provided instead of a conventional ringback tone still has the aforementioned drawbacks. That is, a caller can not identify a called before the called answers and the uniform RBT can not satisfy various subscribers' needs to reveal their personality.

To satisfy such needs of subscribers, a called-based RBT replacement service has been proposed by the same applicant of this invention as Korean patent application whose number and filing date are 10-2002-010006 and Feb. 25, 2002, respectively.

In the proposed method, an arbitrary sound chosen by a called who has subscribed to the RBT replacement service is provided for a calling subscriber instead of a conventional RBT.

However, if a called is not a subscriber of the RBT replacement service, a caller hears inevitably a dry conventional RBT although he or she has been subscribed to the RBT replacement service.

3. DISCLOSURE OF INVENTION

It is an object of the present invention to provide an RBT replacing method in which an arbitrary RBT-replacing sound chosen or registered by a subscriber is provided as an RBT in case that the subscriber calls another who has not subscribed to the called-based RBT replacement service in which an arbitrary RBT-replacing sound chosen by a called is provided for a caller.

A method of providing an arbitrary sound as an RBT in a telephone communication network in accordance with the present invention is characterized in that it comprises: a first step, conducted by an exchanger when a call is received from a terminal, of checking subscriber information to know whether the calling terminal and a called terminal have subscribed to RBT replacement service, and, if it is confirmed from the checking that the calling terminal has subscribed to RBT replacement service and the called terminal is a subscriber of other telephone communication network, requesting a first trunk connection to said other telephone communication network while requesting a second trunk connection to a sound providing means with reference to preset routing information to the sound providing means; a second step, conducted by the sound providing means, of selecting an RBT-replacing sound set for the calling terminal based on information contained in the request of the second trunk connection, and providing the selected RBT-replacing sound for the calling terminal through the exchanger the second trunk connection is made to; and a third step, conducted by the exchanger, of releasing the second trunk connection by requesting the sound providing means to release the second trunk connection when call acceptance of the called terminal is informed via the first trunk connection.

Another method of providing an arbitrary sound as an RBT in a telephone communication network in accordance with the present invention is characterized in that it comprises: a first step, conducted by an HLR (Home Location Register) when a location request message is received from a call-originating exchanger, of checking subscriber information to know whether a calling terminal and a called terminal have subscribed to RBT replacement service, and sending the call-originating exchanger a response message to the location request message, the response message containing information about RBT replacement service subscribed-or-not for the calling and the called terminal; a second step, conducted by the call-originating exchanger, of requesting a first trunk connection to a call-terminating exchanger, and, if the information about RBT replacement service subscribed-or-not indicates that only the calling terminal has subscribed to RBT replacement service, requesting a second trunk connection to a sound providing means with reference to preset routing information to the sound providing means; a third step, conducted by the sound providing means, of selecting an RBT-replacing sound set for the calling terminal based on information contained in the request of the second trunk connection, and providing the selected RBT-replacing sound for the calling terminal through the call-originating exchanger the second trunk connection is made to; and a fourth step, conducted by the call-originating exchanger, of releasing the second trunk connection by requesting the sound providing means to release the second trunk connection when call acceptance of the called terminal is informed via the first trunk connection.

Another method of providing an arbitrary sound as an RBT in a telephone communication network in accordance with the present invention is characterized in that it comprises: a first step, conducted by an HLR when an origination request message is received from a call-originating exchanger, of checking subscriber information to know whether a calling terminal and a called terminal have subscribed to RBT replacement service, and sending the call-originating exchanger a response message to the origination request message, the response message containing information about RBT replacement service subscribed-or-not for the calling and the called terminal and routing information for a sound providing means; a second step, conducted by the call-originating exchanger, of requesting a first trunk connection to the sound providing means with reference to the received routing information included in the response message, if the information about RBT replacement service subscribed-or-not indicates that only the calling terminal has subscribed to RBT replacement service; and a third step, conducted by the sound providing means, of selecting an RBT-replacing sound set for the calling terminal based on information contained in the request of the first trunk connection, and transmitting the selected RBT-replacing sound for the calling terminal through the call-originating exchanger the first trunk connection is made to, and, if the called terminal is a subscriber of other telephone communication network, requesting a second trunk connection to said other telephone communication network, and, if call acceptance of the called terminal is informed via the second trunk connection, stopping transmission of the RBT replacing sound and connecting the first and the second trunk connection to make a communication path between the calling and the called terminal.

Another method of providing an arbitrary sound as an RBT in a telephone communication network in accordance with the present invention is characterized in that is comprises: a first step, conducted by an HLR when a location request message is received from a call-originating exchanger, of checking subscriber information to know whether a calling terminal and a called terminal have subscribed to RBT replacement service, and sending a call-terminating exchanger a routing information request message including service-related information that contains information about RBT replacement service subscribed-or-not for the calling and the called terminal and routing information for a sound providing means; a second step, conducted by the call-terminating exchanger when a first trunk connection request is received from the call-originating exchanger, of requesting a second trunk connection to a sound providing means based on the received service-related information, if it is confirmed from the service-related information that only the calling terminal has subscribed to RBT replacement service; a third step, conducted by the sound providing means, of selecting an RBT-replacing sound set for the calling terminal based on information contained in the request of the second trunk connection, and providing the selected RBT-replacing sound for the calling terminal through the call-originating exchanger; and a fourth step, conducted by the call-terminating exchanger, of releasing the second trunk connection by requesting the sound providing means to release the second trunk connection when a call is accepted by the called terminal.

Owing to the above-characterized method, a caller can hear his or her familiar sound or music instead of a dry RBT in case that a called subscriber does not provide sound or music revealing his or her personality through a subscriber-based RBT replacement service. Therefore, a subscriber-based RBT replacement service can satisfy its subscribers much more.

4. BRIEF DESCRIPTION OF DRAWINGS

In the drawings:

FIG. 1 is a simplified diagram of an embodiment of a mobile communication network which a subscriber-based RBT-replacing sound providing method is embedded in;

FIG. 5 is a procedure chart of the first embodiment to conduct a subscriber-based RBT-replacing sound providing service in case that a called is a non-subscriber of RBT replacement service in accordance with the present invention after the procedure of FIG. 2 and/or FIG. 3 is completed for a caller;

FIG. 6 is a procedure chart of the second embodiment to conduct a subscriber-based RBT-replacing sound providing service in case that a called is a non-subscriber of RBT replacement service in accordance with the present invention after the procedure of FIG. 2 and/or FIG. 3 is completed for a caller;

FIG. 7 is a procedure chart of the third embodiment to conduct a subscriber-based RBT-replacing sound providing service in case that a called is a non-subscriber of RBT replacement service in accordance with the present invention after the procedure of FIG. 2 and/or FIG. 3 is completed for a caller;

FIG. 8 is a procedure chart of the fourth embodiment to conduct a subscriber-based RBT-replacing sound providing service in case that a called is a non-subscriber of RBT replacement service in accordance with the present invention after the procedure of FIG. 2 and/or FIG. 3 is completed for a caller;

5. MODES FOR CARRYING OUT THE INVENTION

In order that the invention may be fully understood, preferred embodiments thereof will now be described with reference to the accompanying drawings.

Figure 1:
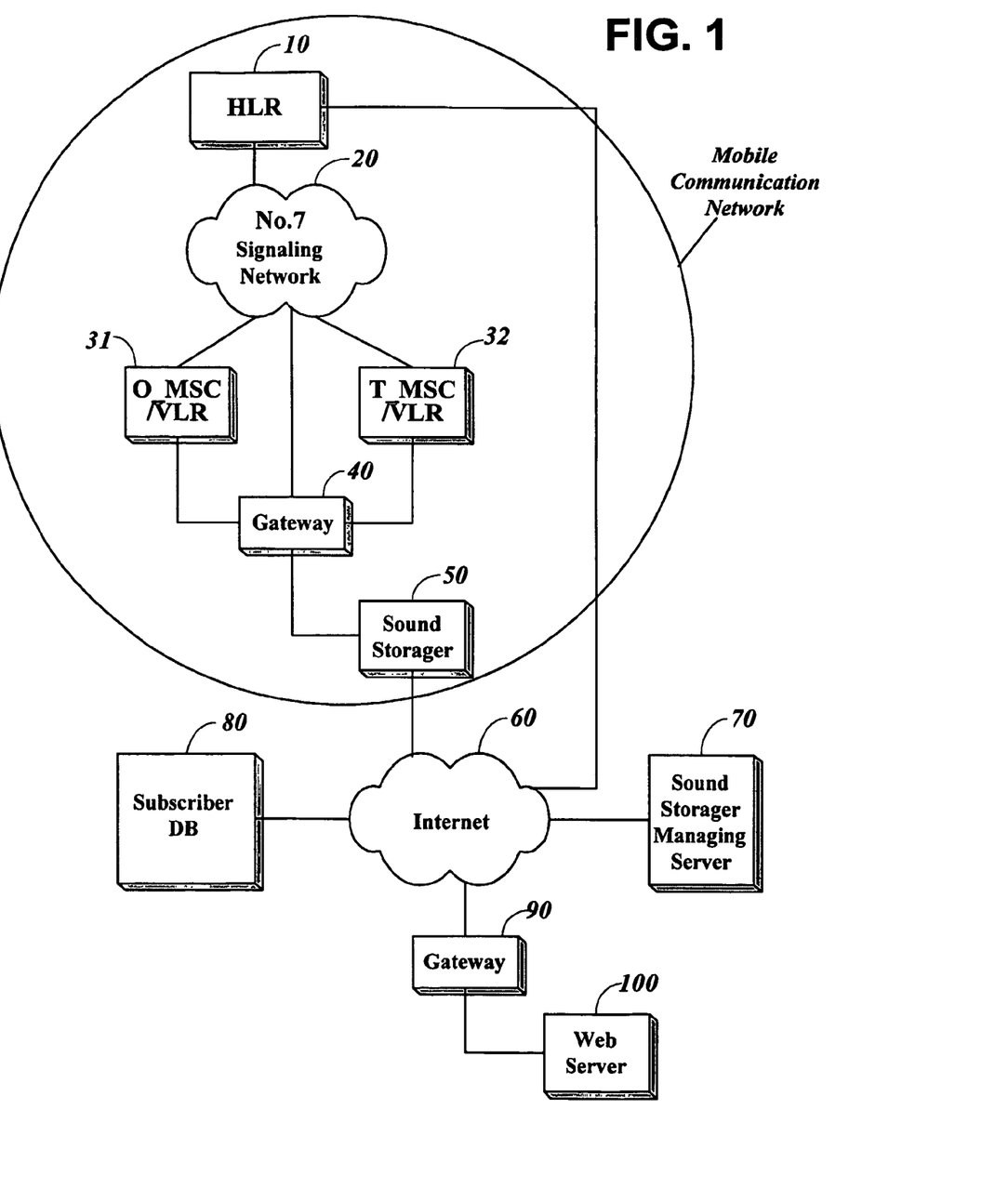

FIG. 1 is a simplified diagram of a mobile communication network which a subscriber-based RBT-replacing sound providing method is embedded in.

The network of FIG. 1 includes an HLR (Home Location Register) 10; mobile exchangers 31 and 32 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing RBT-replacing sounds and communicating with the exchangers 31 and 32; an SSMS (Sound Storager Managing Server) 70, connected to the sound storager 50 via Internet 60, controlling management of RBT-replacing sounds in the sound storager 70; a subscriber db 80 connected to the HLR 10 via Internet 60; and a web server 100, connected to Internet 60 via a gateway 90, communicating with the sound storager 50 and the SSMS 70.

Preferable embodiments of a subscriber-based RBT-replacing sound providing method are explained below in detail along with accompanying operations of the network of FIG. 1.

Figure 2:
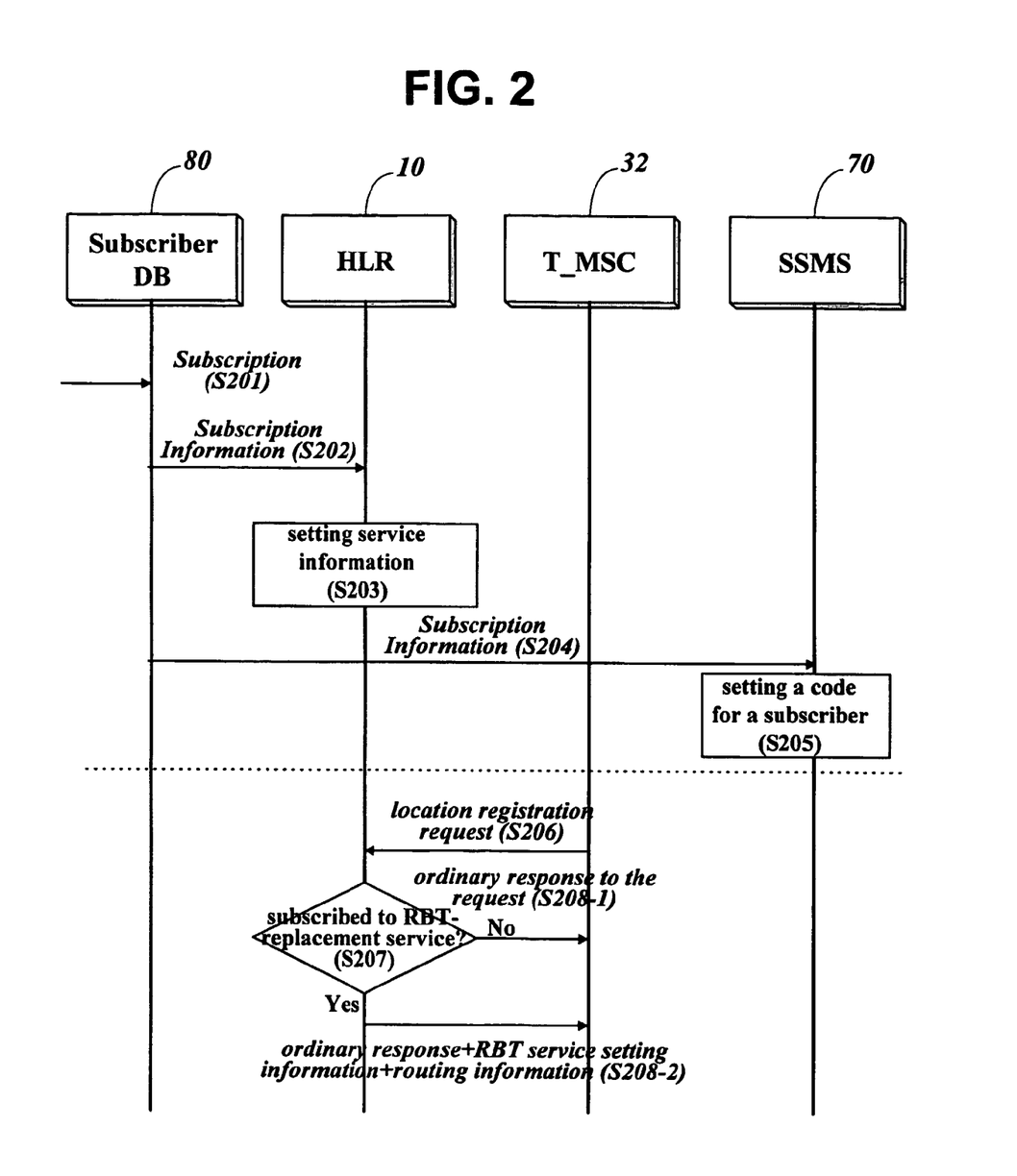
FIG. 2 is a procedure chart to subscribe to a subscriber-based RBT-replacing sound providing service in accordance with the present invention.

FIG. 2 is a procedure chart to subscribe to a subscriber-based RBT-replacing sound providing service in accordance with the present invention.

If subscription to the RBT-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to RBT replacement service (S203).

Figure 9:
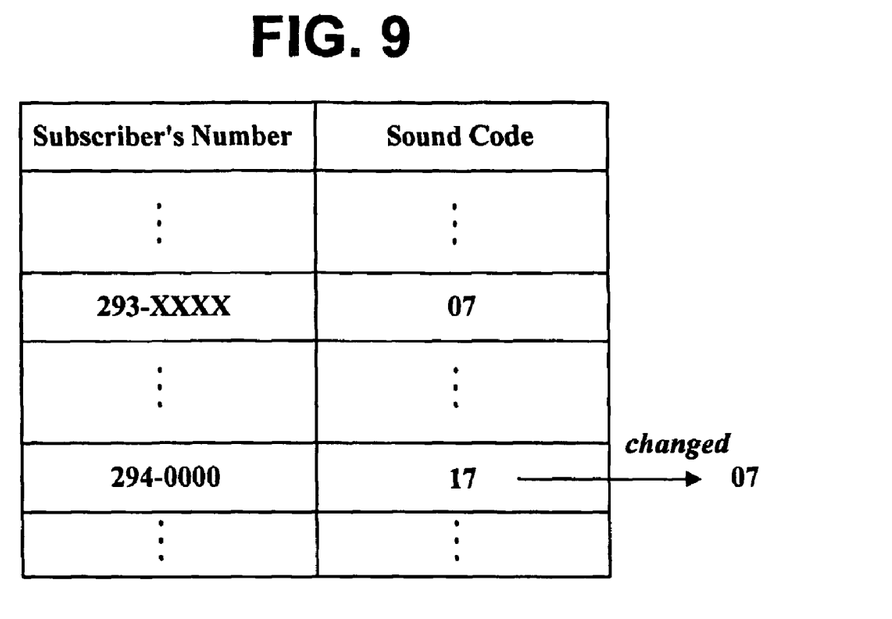
FIG. 9 illustrates an RBT service table structured in a sound storager managing server in accordance with the present invention.

In addition, the subscriber db 80 also sends the subscription information including a chosen digital sound and mobile telephone number to the SSMS 70 (S204). The SSMS 70 writes a code associated with the chosen digital sound in an RBT service table allocated for that mobile telephone number (S205). After several subscriptions to RBT replacement service as above, the RBT service table is illustratively constructed as FIG. 9. In the table of FIG. 9, a sound code '07' is initially assigned to a subscriber of '293-XXXX' and another sound code '17' to another subscriber of '294-0000'.

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S205.

Afterwards, if location registration for the subscriber is requested from the exchanger 32 to the HLR 10 (S206), the HLR 10 checks profile of the subscriber to know whether the subscriber has been subscribed to the RBT replacement service (S207). If not subscribed, the HLR 10 sends a normal response message to the location registration request to the exchanger 32 as in the conventional request processing procedure (S208-1). However, if subscribed, the HLR 10 sends the exchanger 32 a response message including RBT service-set information and routing information, e.g., routing digits to direct to the sound storager 50. The exchanger 32 registers the received information in the subscriber's profile on a local db, e.g., a VLR (Visitor Location Register) (S208-2).

Figure 3:
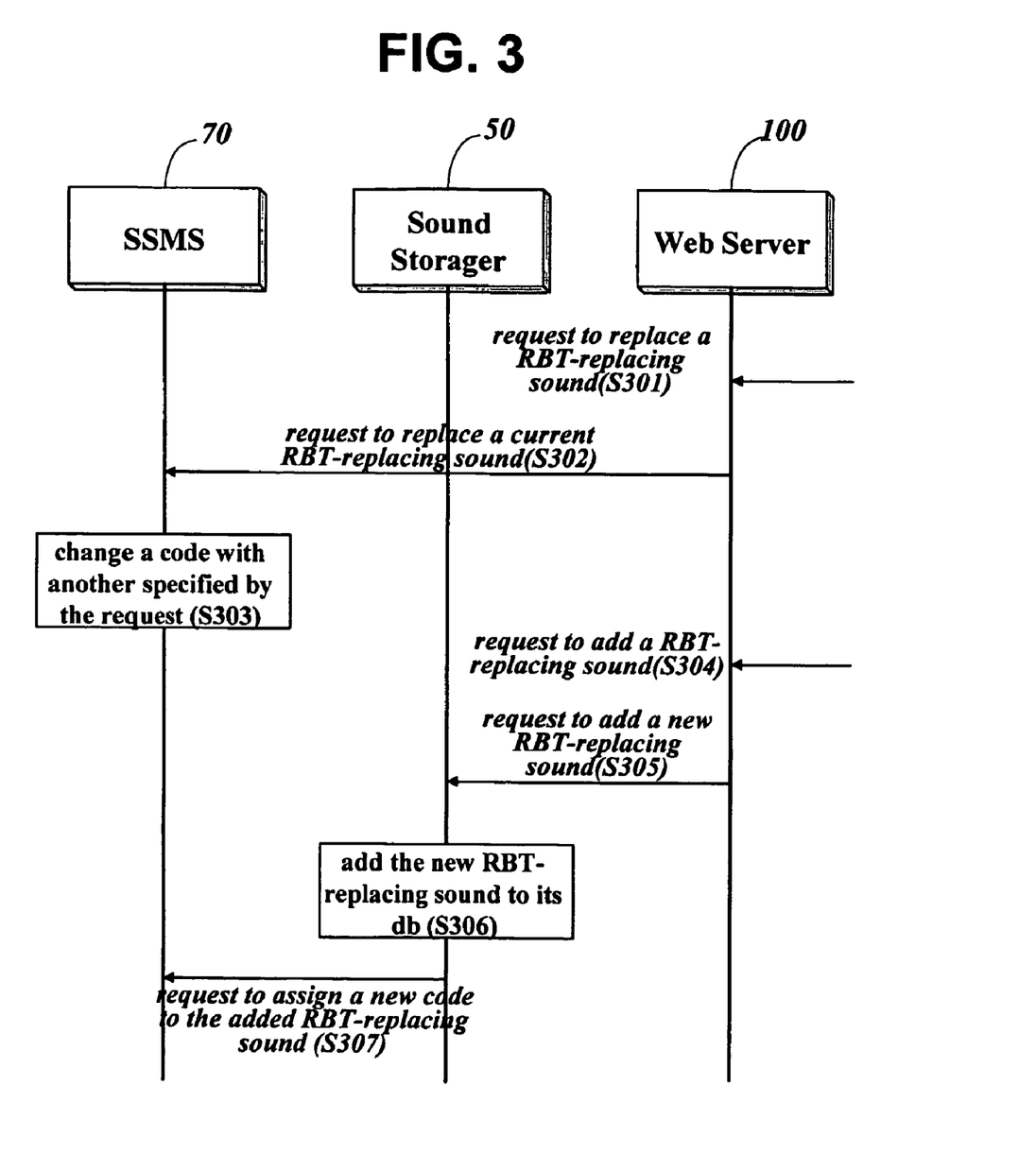
FIG. 3 is a procedure chart to change subscription information related with RBT-replacing sound providing service in accordance with the present invention.

FIG. 3 is a procedure chart to add/change an RBT-replacing sound to be used in RBT-replacing sound providing service in accordance with the present invention.

A subscriber, who has subscribed to the RBT replacement service according to the above-explained procedure of FIG. 2, connects his or her personal computer to the web server 100, first. Then, the web server 100 provides web pages on the connected computer screen to enable the subscriber to change information about RBT replacement service.

Figure 7:
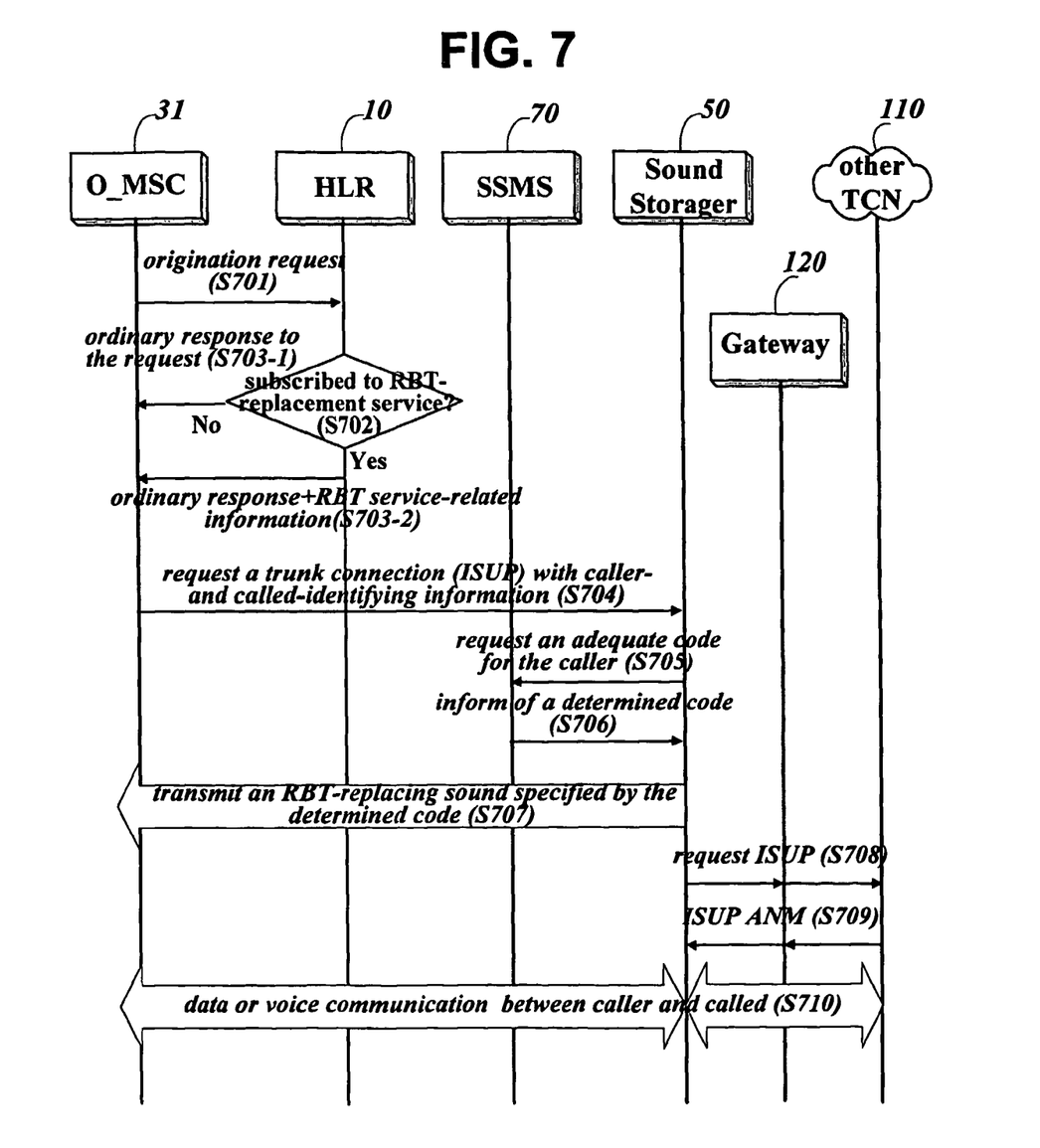
Figure 10:
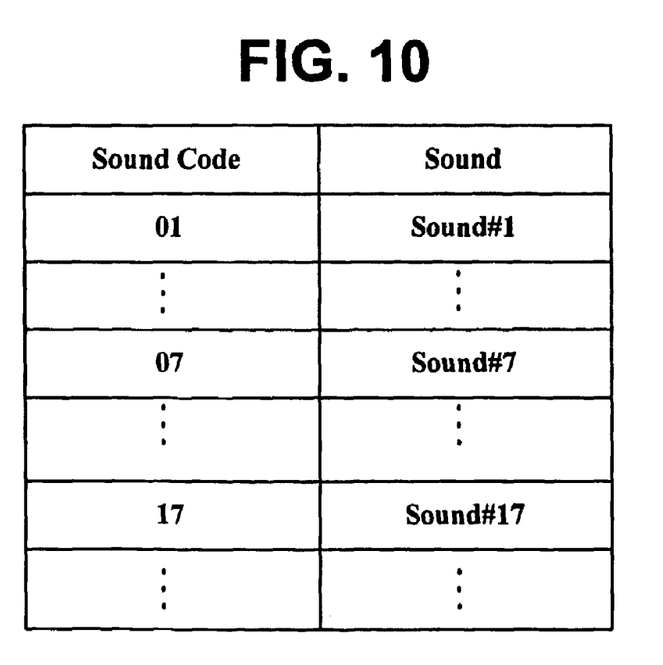
FIG. 10 illustrates a sound list structured in a sound storager that links each RBT-replacing sound to its sound code in accordance with the present invention.

The subscriber enters mobile telephone number, e.g., '294-0000' through an adequate web page and then selects a desired RBT-replacing sound, e.g., sound#7 from a sound list, which is illustrated in FIG. 10, showing all or a part of sounds #1 to #N with their codes stored in the sound storager 50. If the subscriber requests change of RBT-replacing sound to the chosen one, namely sound#7 (S301), the web server 100 sends a change-requesting message to the SSMS 70 (S302). The SSMS 70 changes the current code '17' with another code '07' assigned to the chosen sound #7 in an RBT service table allocated for the entered subscriber number '294-0000' (S303), as shown in FIG. 7. Afterwards, the RBT-replacing sound 'sound#7' identified by the changed code '07' will be provided instead of a conventional RBT.

If the subscriber selects to add a new RBT-replacing sound on a web page, the SSMS 70 provides an input web page. Then, the subscriber enters his or her mobile telephone number in the input web page and uploads a sound file including voice, sound logo, or music through the input web page (S304). The web server 100 requests the sound storager 50 to add a new RBT-replacing sound by delivering the inputted data to the sound storager 50 (S305). The sound storager 50 registers the uploaded sound file as a new RBT-replacing sound (S306) and requests the SSMS 70 to assign a new code to the registered RBT-replacing sound (S307). The SSMS 70 informs the sound storager 50 of the newly-assigned code and changes the current code with the newly-assigned code in an RBT service table allocated for the subscriber.

Figure 4:
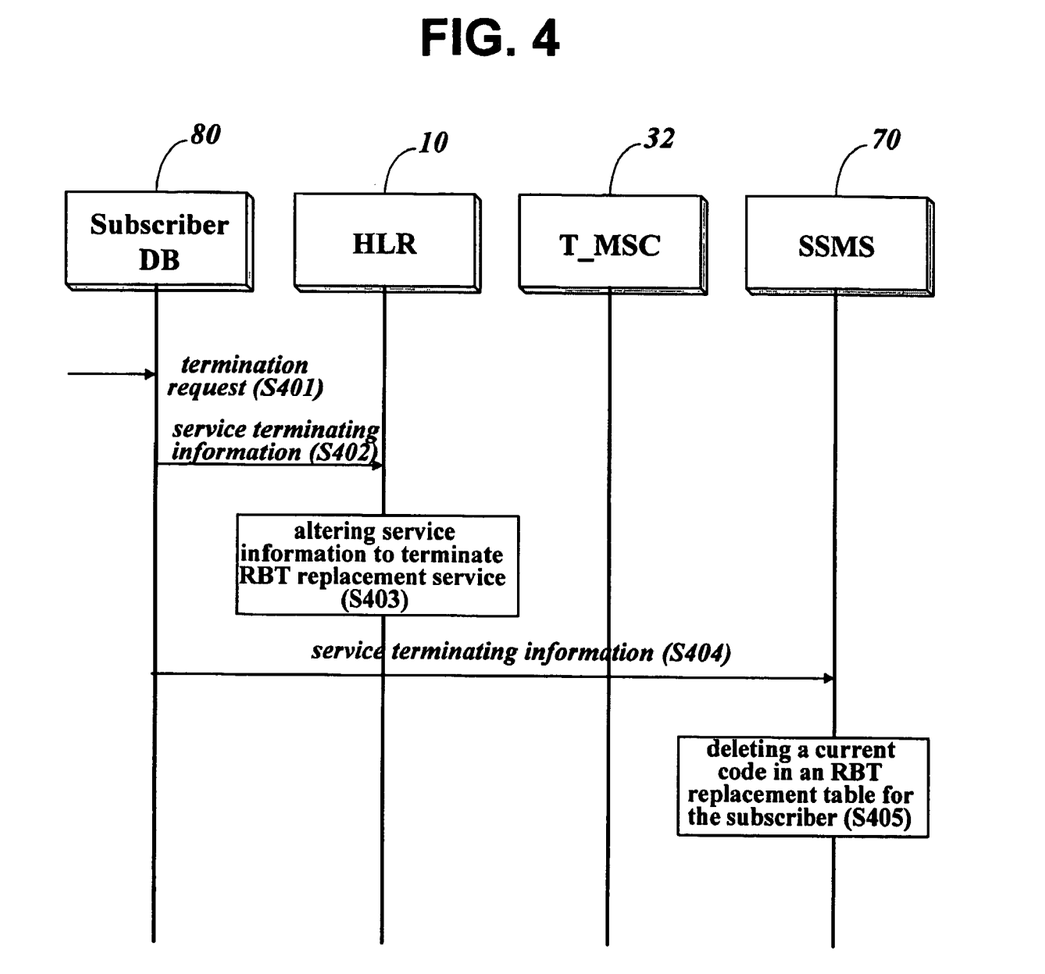
FIG. 4 is a procedure chart to terminate a subscriber-based RBT-replacing sound providing service in accordance with the present invention.

FIG. 4 is a procedure chart to terminate a subscriber-based RBT-replacing sound providing service in accordance with the present invention.

If termination of RBT replacement service is asked from a subscriber (S401), the subscriber db 80 deletes subscription information for RBT replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to RBT replacement service (S403).

The subscriber db 80 also sends the service terminating information to the SSMS 70 (S404), then the SSMS 70 deletes a current code in an RBT service table for the subscriber based on the received service terminating information (S405). For instance, if the subscriber's telephone number included in the service terminating information is '293-XXXX', the SSMS 70 deletes the sound code '07' associated with the number '293-XXXX' in the service table constructed as FIG. 9.

Figure 5:
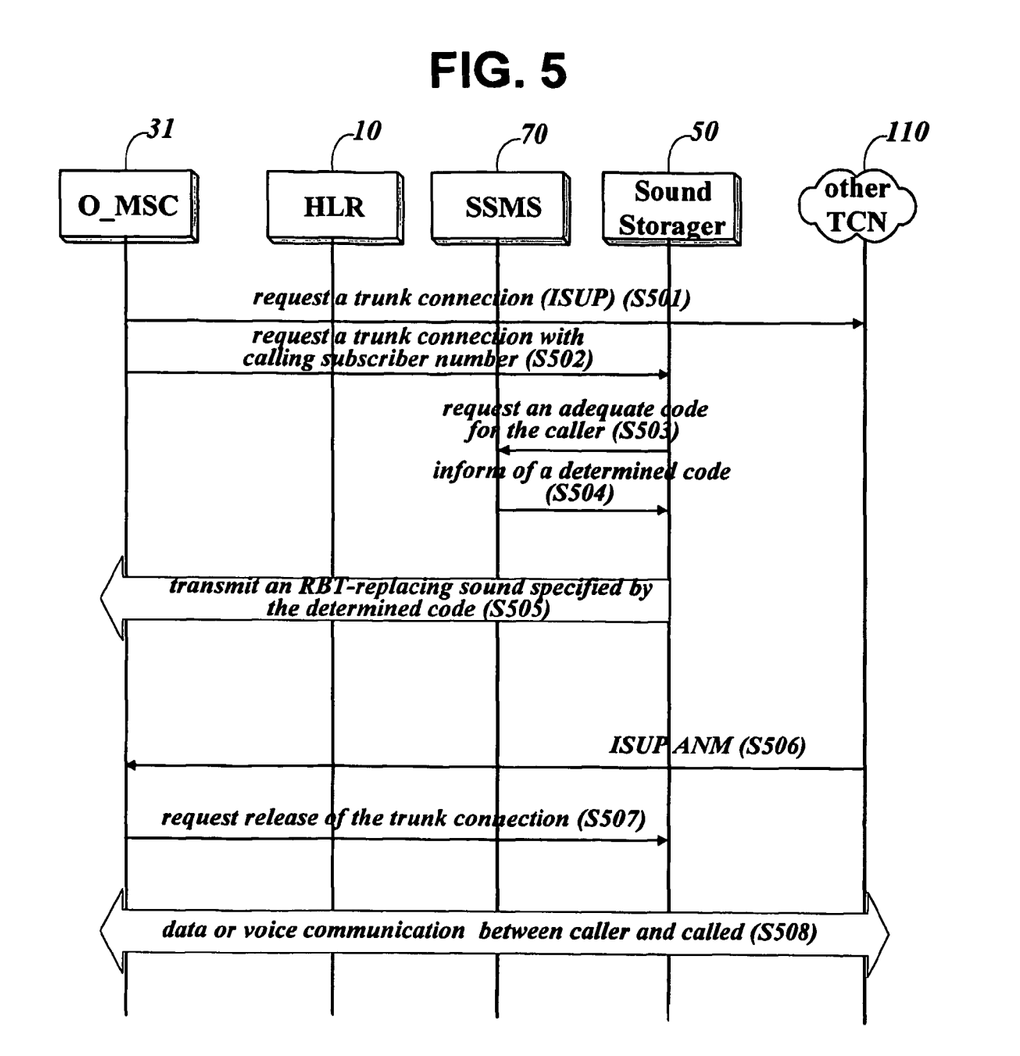

FIG. 5 is a procedure chart of an embodiment to conduct a subscriber-based RBT-replacing sound providing service in case that a called is a non-subscriber of RBT replacement service in accordance with the present invention after the procedure of FIG. 2 and/or FIG. 3 is completed for a caller.

In this embodiment, it is supposed that a caller has subscribed to the RBT replacement service and that a called, who is a subscriber of a different telephone communication network, has not.

If the caller within a service zone of the exchanger 31 calls the called, the originating exchanger 31 knows from prefix of the called number that the called is a subscriber of a different TCN (Telephone Communication Network) 110, so that it requests a trunk connection (called 'ISUP') to a toll or gate exchanger in the different TCN 110 (S501).

At the same time, the originating exchanger 31 checks RBT service-related information, namely, RBT service-set information and routing information directed to a sound storager for the caller to know whether the caller has subscribed to RBT replacement service. Also, it checks whether or not the called has subscribed to RBT replacement service.

Because the called has not, the originating exchanger 31 requests a trunk connection to the sound storager 50 with reference to the RBT service-related information for the caller while providing the caller number for the sound storager 30 (S502).

The originating exchanger 31 determines based on prefix of the number dialed by the caller whether the called is a subscriber of RBT replacement service.

That is, a prefix table to be used for the determination is pre-stored in each exchanger. Thus, if prefix of the called number is included in the prefix table, the originating exchanger 31 regards the called as a non-subscriber. For instance, in the event that prefixes of 016, 018, 019, 02, 031, 032, 033, and so on have been written in the prefix table, if prefix of the called number is 016, the called is regarded as a non-subscriber of RBT replacement service.

If the called is not regarded as a non-subscriber, the originating exchanger 31 inquires the HLR 10 about whether the called is a subscriber of RBT replacement service. If the called is determined to a non-subscriber finally, the originating exchanger 31 requests a trunk connection to the sound storager 50 as aforementioned.

The prefix table can be used to selectively restrict RBT replacement service for subscribers of other TCNs.

Receiving the request of trunk connection at the step S502, the sound storager 50 inquires of the SSMS 70 about which digital sound is set for the caller number included in the ISUP request (S503). In response to the step S503, the SSMS 70 searches its service table for the caller number, and informs the sound storager 50 of a code for digital sound stored in connection with the found caller number (S504). Then, the sound storager 50 transmits a digital sound identified by the received code, namely digital sound set by the caller himself to the caller through the setup trunk connected to the originating exchanger 31 (S505).

If the toll exchanger in other TCN 110 notifies the originating exchanger 31 of call acceptance by the called (S506) through a response message 'ISUP ANM' to the trunk connection requesting step S501 while the RBT replacing sound is being provided, the originating exchanger 31 sends an ISUP release message to the sound storager 50 to stop the transmission of RBT replacing sound (S507). Now, the conversation between the caller and the not-subscribed called is communicated through the trunk connection made between the originating exchanger 31 and the toll exchanger at other TCN (S508).

Figure 6:
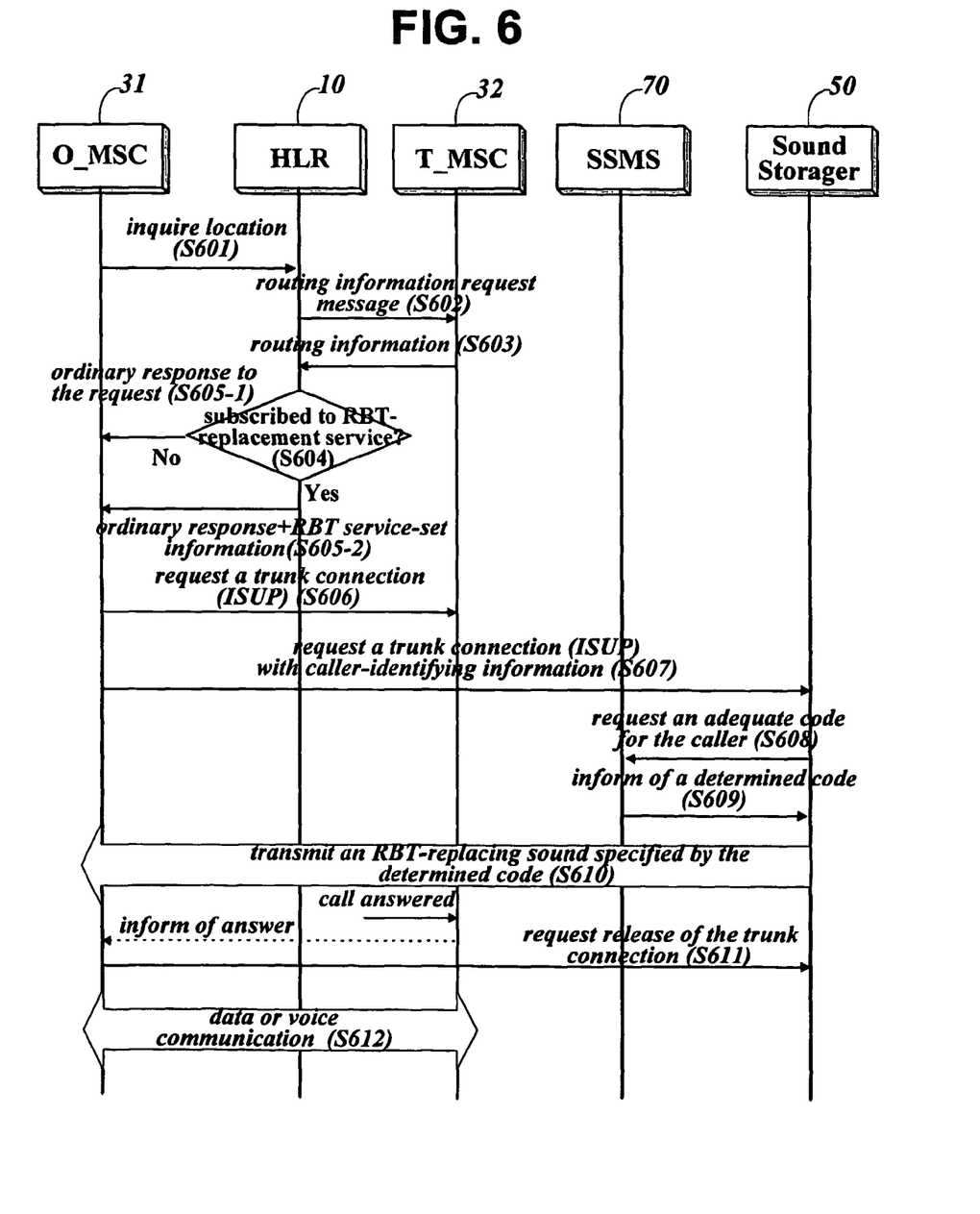

FIG. 6 is a procedure chart of another embodiment to conduct a subscriber-based RBT-replacing sound providing service in case that a called is a non-subscriber of RBT replacement service in accordance with the present invention after the procedure of FIG. 2 and/or FIG. 3 is completed for a caller.

In this embodiment, it is supposed that a caller has subscribed to the RBT replacement service and that a called, a subscriber of same network with the caller, has not.

If an arbitrary subscriber within a service zone of the exchanger 31 calls another subscriber, who has not subscribed to RBT replacement service, within the exchanger 32, the originating exchanger 31 sends a location request message to the HLR 10 to inquire where the called is (S601).

Then, the HLR 10 sends a routing request message to the terminating exchanger 32 (S602), and the terminating exchanger 32 informs the HLR 10 of routing information, e.g., TLDN (Temporary Local Directory Number) directed to itself in response to the routing information request step S602 (S603).

The HLR 10 checks subscribers' db to know whether the called and/or the caller has subscribed to RBT replacement service (S604). If both are non-subscribers the HLR 10 sends an ordinary response message including the received routing information to the originating exchanger 31 (S605-1).

However, because the caller is a subscriber and the called is not from the above assumption, the HLR 10 sends the originating exchanger 31 a special response message to the inquiry step S601 (S605-2). The special response message includes RBT service-set information about for the called and the caller as well as protocol-based ordinary information containing the routing information received at the step S603.

The originating exchanger 31 requests a trunk connection (called 'ISUP') to only the terminating exchanger 32 (S606) or to both of the exchanger 32 and the sound storager 50 (S606 and S607), based on the information included in the location request response message transmitted from the HLR 10 through conduction of the step S605-1 or S605-2.

That is, the originating exchanger 31 makes a single trunk connection to only the terminating exchanger 32 in case of the step S605-1, or dual trunk connections to both in case of the step S605-2.

The sound storager 50 is determined among a plurality of sound storagers from routing information pre-stored in connection with the caller number or its head number, e.g., 3 or 4 head digits. In addition, when requesting a trunk connection to the sound storager 50 the caller number is sent to the sound storager 50 through the requesting message because the called is not subscriber of RBT replacement service.

Now, a single trunk connection is made between the originating 31 and the terminating exchanger 32 in the event that only the step S606 is conducted, or respective trunk connections are made between the originating 31 and the terminating exchanger 32 and between the originating exchanger 31 and the sound storager 50 in the event that both steps S606 and S607 are conducted together.

When a trunk connection is made to the originating exchanger 31 according to conduction of the step S607, the sound storager 50 asks an adequate code to the SSMS 70 while providing the received caller number for the SSMS 70 (S608). The SSMS 70 searches the RBT service table for the caller number to determine an assigned code, and informs the sound storager 50 of the determined code (S609) in response to the code-requesting step S608. The sound storager 50 searches the sound list on its db for the determined code and plays back an RBT replacing sound identified by the code to the caller through the trunk connection made between the sound storager 50 and the originating exchanger 31 (S610). As a result, the caller hears a sound or music set by himself instead of a conventional RBT.

If the called answers call of the terminating exchanger 32 while the determined sound is being transmitted instead of a conventional RBT, the originating exchanger 31 that is informed of such an answer by the terminating exchanger 32 requests the sound storager 50 to release the established trunk connection (S611). Then, voice or data are communicated between the caller and the not-subscribed called through the trunk connection between the originating 31 and the terminating exchanger 32 (S612).

FIG. 7 is a procedure chart of another embodiment to conduct a subscriber-based RBT-replacing sound providing service in case that a called is a non-subscriber of RBT replacement service in accordance with the present invention after the procedure of FIG. 2 and/or FIG. 3 is completed for a caller.

In this embodiment, it is supposed that a caller has subscribed to the RBT replacement service and that a called, a subscriber of other TCN, has not.

If the caller within a service zone of the exchanger 31 calls the called, the originating exchanger 31 sends an origination request message to the HLR 10 (S701). Then, the HLR 10 checks profile of the caller and the called subscriber to know whether the subscribers have subscribed to the RBT replacement service (S702). If both have not, the HLR 10 sends an ordinary response message to the origination request to the originating exchanger 31 as in the conventional request processing procedure (S703-1). However, because only the called has subscribed from the above assumption, the HLR 10 sends the exchanger 31 a response message including RBT service-related information including routing information directed to the sound storager 50 assigned for the caller (S703-2).

In the event that the step S703-1 is conducted by the HLR 10, the originating exchanger 31 conducts the same call processing procedure as conventional. However, because the step S703-2 is conducted by the HLR 10 from the above assumption, the originating exchanger 31 makes a trunk connection to the sound storager 50 with reference to routing information included in the received RBT service-related information while providing the caller and the called number of the non-subscriber (S704).

When a trunk connection is made to the originating exchanger 31 according to conduction of the step S704, the sound storager 50 asks an adequate code to the SSMS 70 while providing the received caller number for the SSMS 70 (S705). The SSMS 70 searches the RBT service table for the caller number to determine an assigned code and informs the sound storager 50 of the determined code (S706) in response to the code-requesting step S705. The sound storager 50 searches the sound list on its db, for the determined code and transmits the sound associated with the found code to the caller through the originating exchanger 31 (S707). As a result, the caller hears a sound or music set by himself instead of a conventional RBT.

While transmitting the RBT replacing sound, the sound storager 50, which knows from prefix of the called number that the called is a subscriber of a different TCN, requests a trunk connection to a toll exchanger in the different TCN 110 through a gateway 120 (S708). Afterwards, if the called accepts the call from the caller, the toll exchanger notifies the sound storager 50 of the call acceptance (S709) through a response message 'ISUP ANM' for the trunk connection requesting step S708.

Acknowledging the call acceptance, the sound storager 50 stops the transmission of RBT replacing sound, and connects the two trunk connections made respectively between the originating exchanger 31 and itself and between the toll exchanger in the different TCN and itself. Now, the conversation between the caller and the not-subscribed called is communicated through the connected path established by the sound storager 50 (S710).

Figure 8:
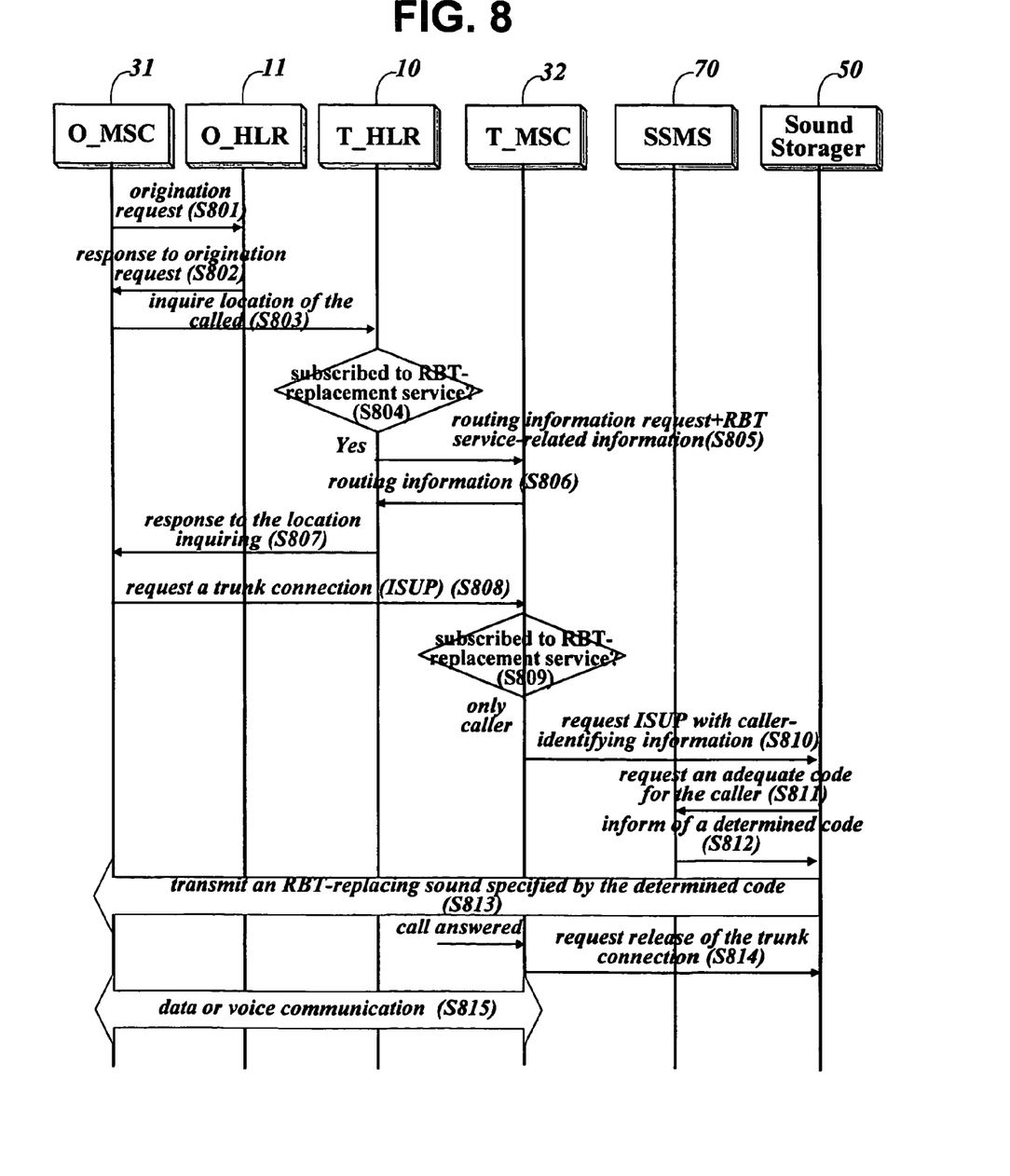

FIG. 8 is a procedure chart of another embodiment to conduct a subscriber-based RBT-replacing sound providing service in case that a called is a non-subscriber of RBT replacement service in accordance with the present invention after the procedure of FIG. 2 and/or FIG. 3 is completed for a caller.

In this embodiment, it is supposed that a caller has subscribed to the RBT replacement service and that a called, a subscriber of same network with the caller, has not.

If the caller dials the called of a non-subscriber within a service zone of the exchanger 32, the originating exchanger 31 sends an origination request to an HLR 11 (called 'originating HLR') assigned to the caller number (S801). Then, the originating HLR 11 searches its subscribers' db for the called number. If not found, the originating HLR 11 delivers the called number to the originating exchanger 31 in response to the origination request (S802).

According to the response step S802, the originating exchanger 31 sends a location request message to the HLR 10, which is assigned to the called number, to inquire where the called is (S803). Then, the HLR 10 checks subscribers' db to know whether the called and/or the caller has subscribed to RBT replacement service (S804).

Sending a routing information request message to the terminating exchanger 32, the HLR 10 inserts RBT service information in the routing information request message (S805). Because of the above assumption, the RBT service information includes routing information for the sound storager 50 assigned for the caller number and it indicates that the caller is a subscriber of RBT replacement service and the called is not.

Then, the terminating exchanger 32 informs the HLR 10 of its routing information, e.g., TLDN directed to itself in response to the routing information request message (S806). The HLR 10 delivers the routing information to the originating exchanger 31 in response to the inquiry step S803 (S807). The originating exchanger 31 requests a trunk connection (ISUP) to the terminating exchanger 32 based on the received routing information (S808).

Receiving the ISUP request from the originating exchanger 31, the terminating exchanger 32 determines, based on the RBT service information received at the previous step S805, that the caller is a subscriber and the called is not (S809). Accordingly, requesting a trunk connection to the sound storager 50 addressed by the routing information contained in the RBT service information, the terminating exchanger 32 provides the sound storager 50 with the caller number other than the called one (S810).

The sound storager 50 asks an adequate code to the SSMS 70 while providing the received caller number for the SSMS 70 (S811). The SSMS 70 searches the RBT service table for the caller number to determine an assigned code, and informs the sound storager 50 of the determined code (S812) in response to the code-requesting step S811. The sound storager 50 searches the sound list on its db for the determined code and transmits an RBT replacing sound identified by the code to the caller through the terminating exchanger 32 (S813). As a result, the caller hears a sound or music set by himself instead of a conventional RBT.

If the called answers call paging of the terminating exchanger 32 while the determined sound is being transmitted instead of a conventional RBT, the terminating exchanger 32 requests the sound storager 50 to release the established trunk connection (S814). Then, voice or data are communicated between the caller and the called of non-subscriber through the trunk connection between the originating exchanger 31 and the terminating one 32 (S815).

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing an arbitrary sound as an RBT (RingBack Tone) in a telephone communication network, comprising:

a first step, conducted by an exchanger when a call is received from a terminal, of checking subscriber information to know whether the calling terminal and a called terminal have subscribed to RBT replacement service, and, if it is confirmed from the checking that the calling terminal has subscribed to RBT replacement service and the called terminal is a subscriber of other telephone communication network, requesting a first trunk connection to said other telephone communication network while requesting a second trunk connection to a sound providing means with reference to preset routing information to the sound providing means;

a second step, conducted by the sound providing means, of selecting an RBT-replacing sound set for the calling terminal based on information contained in the request of the second trunk connection, and providing the selected RBT-replacing sound for the calling terminal through the exchanger the second trunk connection is made to; and a third step, conducted by the exchanger, of releasing the second trunk connection by requesting the sound providing means to release the second trunk connection when call acceptance of the called terminal is informed via the first trunk connection.

2. The method of claim 1, wherein the confirmation that the called terminal is a subscriber of other telephone communication network is based on a prefix of telephone number dialed by the calling terminal.

3. A method of providing an arbitrary sound as an RBT (RingBack Tone) in a telephone communication network, comprising:

a first step, conducted by an HLR (Home Location Register) when a location request message is received from a call-originating exchanger, of checking subscriber information to know whether a calling terminal and a called terminal have subscribed to RBT replacement service, and sending the call-originating exchanger a response message to the location request message, the response message containing information about RBT replacement service subscribed-or-not for the calling and the called terminal;

a second step, conducted by the call-originating exchanger, of requesting a first trunk connection to a call-terminating exchanger, and, if the information about RBT replacement service subscribed-or-not indicates that only the calling terminal has subscribed to RBT replacement service, requesting a second trunk connection to a sound providing means with reference to preset routing information to the sound providing means;

a third step, conducted by the sound providing means, of selecting an RBT-replacing sound set for the calling terminal based on information contained in the request of the second trunk connection, and providing the selected RBT-replacing sound for the calling terminal through the call-originating exchanger the second trunk connection is made to; and a fourth step, conducted by the call-originating exchanger, of releasing the second trunk connection by requesting the sound providing means to release the second trunk connection when call acceptance of the called terminal is informed via the first trunk connection.

4. A method of providing an arbitrary sound as an RBT (RingBack Tone) in a telephone communication network, comprising:

a first step, conducted by an HLR (Home Location Register) when an origination request message is received from a call-originating exchanger, of checking subscriber information to know whether a calling terminal and a called terminal have subscribed to RBT replacement service, and sending the call-originating exchanger a response message to the origination request message, the response message containing information about RBT replacement service subscribed-or-not for the calling and the called terminal and routing information for a sound providing means;

a second step, conducted by the call-originating exchanger, of requesting a first trunk connection to the sound providing means with reference to the received routing information included in the response message, if the information about RBT replacement service subscribed-or-not indicates that only the calling terminal has subscribed to RBT replacement service; and a third step, conducted by the sound providing means, of selecting an RBT-replacing sound set for the calling terminal based on information contained in the request of the first trunk connection, and transmitting the selected RBT-replacing sound for the calling terminal through the call-originating exchanger the first trunk connection is made to, and, if the called terminal is a subscriber of other telephone communication network, requesting a second trunk connection to said other telephone communication network, and, if call acceptance of the called terminal is informed via the second trunk connection, stopping transmission of the RBT replacing sound and connecting the first and the second trunk connection to make a communication path between the calling and the called terminal.

5. The method of claim 4, wherein the call-originating exchanger provides information about the calling and the called terminal while requesting the first trunk connection.

6. The method of claim 5, wherein said information about the calling and the called terminal is telephone number.

7. The method of claim 4, wherein whether the called terminal is a subscriber of other telephone communication network is determined based on a prefix of telephone number dialed by the calling terminal.

8. A method of providing an arbitrary sound as an RBT (RingBack Tone) in a telephone communication network, comprising:

a first step, conducted by an HLR (Home Location Register) when a location request message is received from a call-originating exchanger, of checking subscriber information to know whether a calling terminal and a called terminal have subscribed to RBT replacement service, and sending a call-terminating exchanger a routing information request message including service-related information that contains information about RBT replacement service subscribed-or-not for the calling and the called terminal and routing information for a sound providing means;

a second step, conducted by the call-terminating exchanger when a first trunk connection request is received from the call-originating exchanger, of requesting a second trunk connection to a sound providing means based on the received service-related information, if it is confirmed from the service-related information that only the calling terminal has subscribed to RBT replacement service;

a third step, conducted by the sound providing means, of selecting an RBT-replacing sound set for the calling terminal based on information contained in the request of the second trunk connection, and providing the selected RBT-replacing sound for the calling terminal through the call-originating exchanger; and a fourth step, conducted by the call-terminating exchanger, of releasing the second trunk connection by requesting the sound providing means to release the second trunk connection when a call is accepted by the called terminal.

* * * * *